United States Patent [19]

Mikami et al.

[11] Patent Number: 5,067,161
[45] Date of Patent: Nov. 19, 1991

[54] IMAGE RECOGNITION DEVICE

[75] Inventors: Kazuo Mikami, Kyoto; Hideshi Ishihara, Takatsuki; Masahiro Nishimura, Kyoto; Noriyuki Tsukiyama; Seisuke Hinoda, both of Uji, all of Japan

[73] Assignee: Omron Tateisi Electronics Co., Nagaokakyo, Japan

[21] Appl. No.: 228,836

[22] Filed: Aug. 3, 1988

Related U.S. Application Data

[63] Continuation of Ser. No. 752,737, Jul. 8, 1985, abandoned.

[30] Foreign Application Priority Data

Jul. 9, 1984 [JP] Japan ................ 59-143072

[51] Int. Cl.$^5$ .............................................. G06K 9/00
[52] U.S. Cl. .................................... 382/1; 382/41
[58] Field of Search ................. 358/125, 126, 166; 382/18, 27, 28, 30, 34, 41, 25

[56] References Cited

U.S. PATENT DOCUMENTS

| | | | |
|---|---|---|---|
| 3,217,295 | 11/1965 | Barr | 382/30 |
| 3,541,246 | 11/1970 | Goldfischer | 358/125 |
| 3,614,736 | 10/1971 | McLaughlin | 382/34 |
| 4,060,830 | 11/1977 | Woolfson | 358/126 |
| 4,365,304 | 12/1982 | Ruhman | 358/166 |
| 4,398,256 | 8/1983 | Nussmeier | 382/54 |
| 4,486,775 | 12/1984 | Catlow | 382/34 |
| 4,511,920 | 4/1985 | Iijima | 358/139 |
| 4,550,432 | 10/1985 | Andersson | 382/41 |

Primary Examiner—Leo H. Boudreau
Attorney, Agent, or Firm—Dickstein, Shapiro & Morin

[57] ABSTRACT

A visual recognition device receives video signals representing an object to be recognized from a video camera, converts the video signals to a two-valued input pattern, and compares the input pattern with a standard pattern to recognize the object. The recognition device includes an auxiliary computing unit which carries out a predetermined auxiliary computation during a horizontal scan period of the video camera, in accordance with the state of the input pattern; a main computation unit for carrying out, during a vertical return scan blanking period of the video camera, a main computation based on computation results of the auxiliary computation 108 unit; and a recognition unit for recognizing the input pattern with respect to the standard pattern based on computation results of the main computation unit with respect to the patterns.

1 Claim, 8 Drawing Sheets

TWO-DIMENSIONAL COMPOSITE VIDEO SIGNAL TIMING

IMAGE RECOGNITION DEVICE

This application is a continuation of application Ser. No. 752,737, filed July 8, 1985, now abandoned.

BACKGROUND OF THE INVENTION

The present invention relates to an image recognition device which obtains an input pattern from a monochrome, two-valued image signal of a stationary or moving object to be recognised, compares the input pattern with a standard pattern, and recognises the object to be recognised, and in particular the present invention provides, in the pattern comparison, a new position shift detection method which detects at high speed the amount of shift of the input pattern compared with the standard pattern.

A conventional image recognition device, for example, a two-dimensional image recognition device, overlays as an image an input pattern and a standard pattern, and, by detecting the degree of alignment of the overlaid patterns, recognises the object to be recognised. Therefore, when making the pattern comparison, the two patterns must be accurately aligned, and conventionally, after moving the object to be recognised to a particular stationary position using for example an XY stage, an input pattern is obtained from television camera, and comparison processing of this input pattern with a standard pattern carried out. With this method, however, a mechanism is required to position the object to be recognised, so that, not only is the whole device resultingly more complicated, the pattern comparision time is increased by the positioning scan time, and many other problems tend to occur also.

The present inventors have, previously to the development of the present invention, developed a method whereby the positions of corresponding portions of the input pattern and standard pattern are detected on an image, and the positional deviations are computed, whereby the patterns are aligned as data. It should be particularly understood that it is not hereby intended to admit this concept as prior art to this patent application except to the extent in any case otherwise prescribed by applicable law. In this method, if there is noise present in the input pattern for example, the noise portion may be recognised falsely as part of the pattern, and in this case an incorrect pattern alignment will be carried out, and it has been established that there is a danger that proper recognition of the object will not be possible.

SUMMARY OF THE INVENTION

Accordingly, it is the primary object of the present invention to provide an image recognition device, which avoids the above identified problems.

It is a further object of the present invention to provide such an image recognition device, which provides good, proper, and reliable object recognition.

It is a further object of the present invention to provide such an image recognition device, which is not particularly subject to disturbance by noise.

It is a further object of the present invention to provide such an image recognition device, which is not prone to incorrect pattern alignment.

It is a further object of the present invention to provide such an image recognition device, which does not require any mechanism for positioning the object to be recognized.

It is a further object of the present invention to provide such an image recognition device, which is simple in construction and therefore is cheap.

It is a yet further object of the present invention to provide such an image recognition device, which can operate quickly.

It is a yet further object of the present invention to provide such an image recognition device, which can rapidly and easily carry out object recognition even if the input pattern is displaced.

It is a yet further object of the present invention to provide such an image recognition device, which implements the pattern alignment operation in data.

It is a yet further object of the present invention to provide such an image recognition device, which performs the pattern alignment operation by the use of firmware.

According to the present invention, these and other objects are accomplished by a visual recognition device which converts to a two-valued input pattern an image signal of an object to be recognised, and compares said input pattern with a standard pattern to recognise said object to be recognised, comprising: an auxiliary computing means for carrying out a particular auxiliary computation during a horizontal scan period of said patterns, according to the state of the pattern; a main computation means for, during a vertical return scan blanking period, carrying out a main computation based on the computation results of said auxiliary computation means; and a recognition means for recognising said input pattern with respect to said standard pattern based on the computation results of said main computation means with respect to said patterns.

According to such a structure, since the auxiliary calculation and main calculation are carried out in real time, principally in firmware, memory to store the image signals for the input pattern and standard pattern, which is necessary in a conventional device, is not required, and the computation speed is greatly increased.

Since also positioning of the object to be recognised to a particular position is not necessary, and no special positioning construction is required, the device as a whole can be made simpler, the time required for a positioning scan can be saved, and the efficiency of object recognition processing can be increased. Since also the pattern positions are found without complicated image analysis software processing, and can be obtained using a simple hardware construction of counters and so forth, a great improvement in processing efficiency can be offered.

BRIEF DESCRIPTION OF THE DRAWINGS

The present invention will now be described in terms of the preferred embodiment thereof, and with reference to the appended drawings. However, it should be understood that the description of the embodiment, and the drawings, are not any of them intended to limit the scope of the present invention, since this scope is to be understood as defined by the appended claim, in its legitimate and proper interpretation. In the drawings, like reference symbols denote like parts and dimensions and so on in the separate figures thereof; spatial terms are to be understood as referring only to the orientation on the paper of the relevant figure and not to any actual orientation of an embodiment, unless otherwise qualified; and:

DESCRIPTION OF THE PREFERRED EMBODIMENT

The present invention will now be described in detail with respect to the preferred embodiment thereof, and with reference to the drawings. First, with regard to the operation of said preferred embodiment of this invention, the case will be described in which the centers of gravity of the input pattern and the standard pattern will be found, and, by comparison of the barycentric coordinates, the deviation of the input pattern with respect to the standard pattern will be sought. This principle will be explained with reference to FIG. 1 and FIG. 2.

Figure 1A:
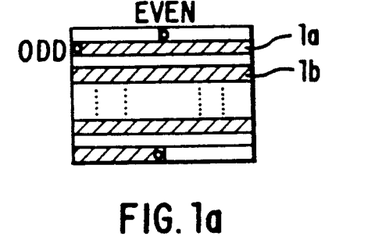
FIG. 1a shows an exemplary visual field which is being scanned by a two dimensional CCD type video camera incorporated in the preferred embodiment of the image recognition device of the present invention
Figure 1B:
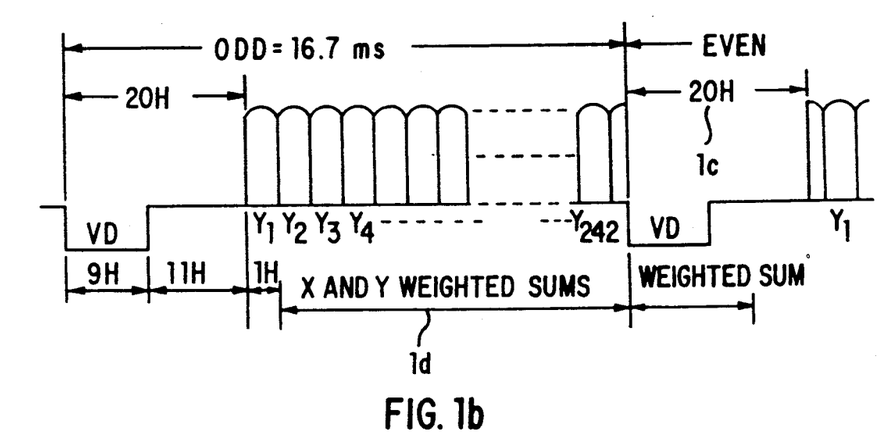
FIG. 1b shows an example of the video signal produced by said video camera representative of the image in said visual field of said camera.
Figure 1C:
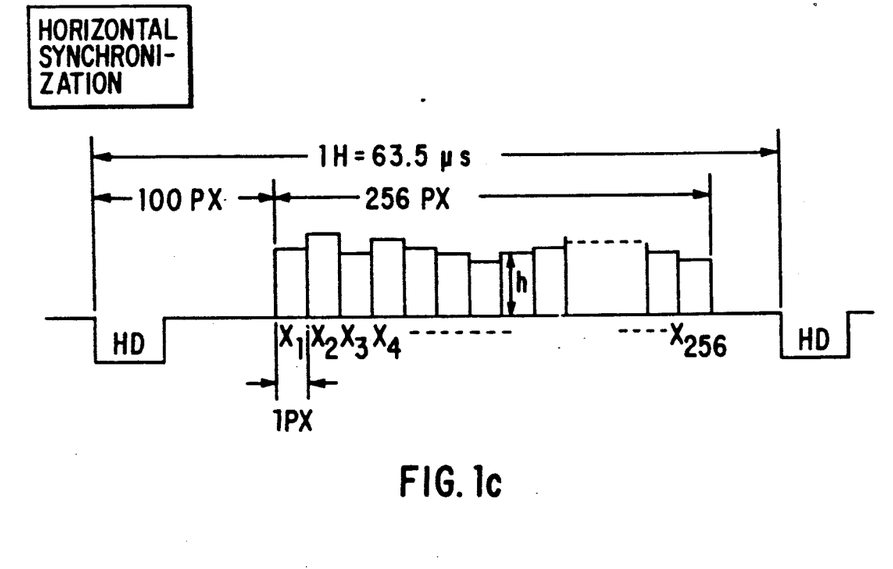
FIG. 1c shows an enlargement of a single line portion of said video signal.

FIG. 1a shows an exemplary visual field which is being scanned by a two dimensional CCD type video camera, FIG. 1b shows an example of the video signal produced by said video camera representative of the image in said visual field of said camera FIG. 1c shows an enlargement of a single line portion of said video signal. This camera is carrying out interlaced scanning. First, the diagonally hatched portion 1a is scanned from one of its ends to the other in 16.7 ms, and next the next diagonally hatched portion 1b is scanned from one of its ends to the other in the same way. The interval 1c shown in FIG. 1b is the blanking interval, i.e. the blank interval for vertical scan return, and the signal VD is a vertical synchronization signal. The reference symbol 1d in FIG. 1b denotes the actual video waveform. As will be described in detail below, in the interval 4, the X and Y weighted sums are computed, and, based upon these results, the center of gravity computation is carried out by software during the blanking period. Therefore, the center of gravity computation for one image portion can be completed within 16.7 ms.

Referring to the enlarged single line portion of the video signal shown in FIG. 1c, HD is a horizontal synchronization signal, and each of the signals X1, X2, X3, X4, ... X256 represents the intensity of a single pixel of the image. The height as designated by "h" in FIG. 1c of the signals X1, X2, ... basically represents the density of the relevant picture element, but in fact in this application, although it is not clearly so shown in the figure, h can only be equal to zero or unity, and only zero and full intensity representations of each pixel are available. This is in order to simplify the processing by using only two valued operations.

Figure 2:
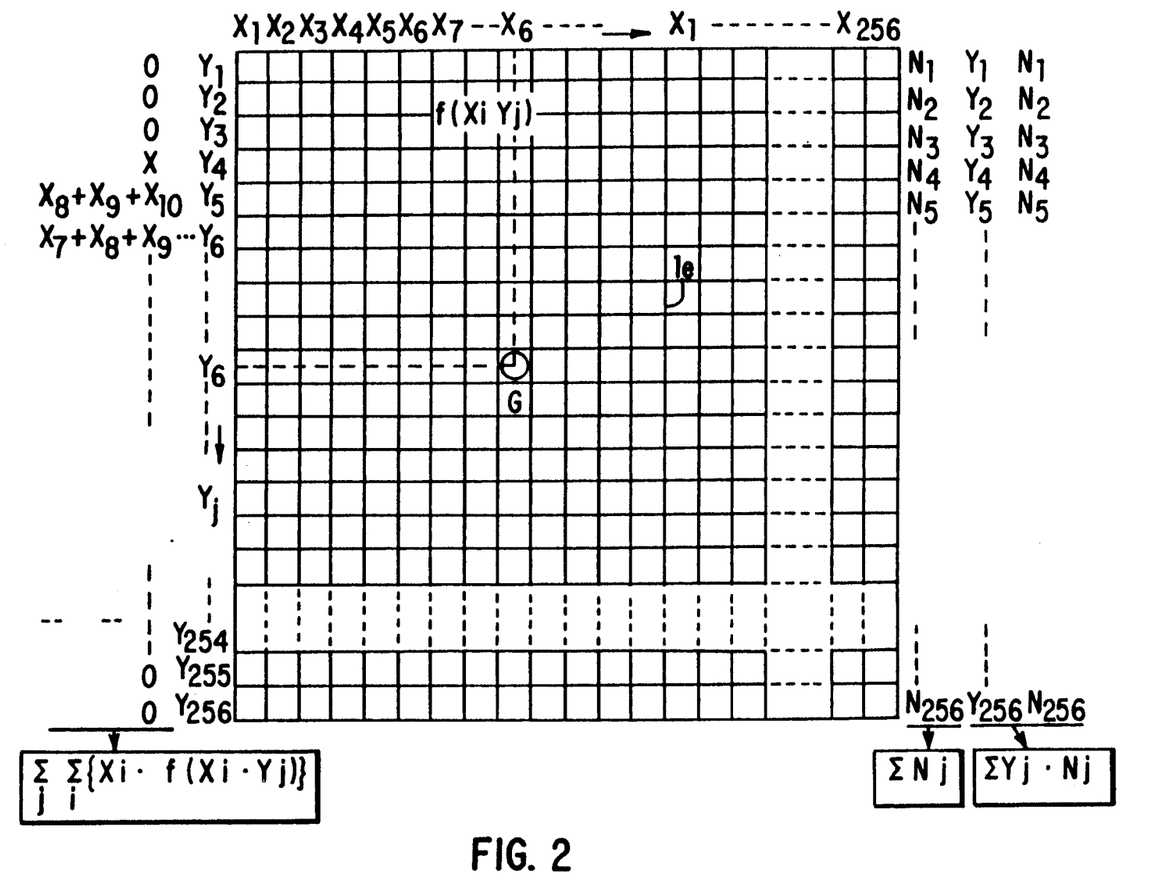
FIG. 2 shows the pixel representation of an object in the visual field of said video camera, and the X axis is shown in the horizontal direction while the Y axis is shown along the vertical direction.

Next, the principle of this high speed center of gravity computation using firmware will be explained, with reference to FIG. 2. In FIG. 2, an object 1e is shown in its pixel representation in the visual field of the video camera, and the X axis is shown in the horizontal direction while the Y axis is shown along the vertical direction. Since the representation of the image of the object is as explained above in terms of two pixel intensities only, the weight function f(X,Y) is two-valued, with the interior of the object showing as '1' and the surroundings of the object showing as '0'. For every horizontal line that is scanned, the number of pixels Nj for which f(X,Y) is '1', the product of this Nj and the Y coordinate of its line, and the sum of the X coordinates of pixels for which f(X,Y) is '1' are computed. When these three values are summed:

$$\Sigma N_j, \Sigma Y_j \cdot N_j$$

and $$\sum_j \sum_i \{X_i \cdot f(X_i, Y_j)\}$$

can be computed.

$$\sum_j \sum_i \{X_i \cdot f(X_i, Y_j)\}$$

is the X coordinate weighted sum, and corresponds to the numerator of equation (1):

$$XG = \frac{\sum_i X_i \cdot \sum_j f(X_i, Y_j)}{\Sigma \Sigma f(X_i, Y_j)} \quad (1)$$

$$= \frac{\sum_i \sum_j \{(X_i \cdot f(X_i, Y_j)\}}{\sum_j N_j}$$

$$\sum_j Y_j \cdot N_j$$

is the Y coordinate weighted sum, the numerator of equation (2):

$$YG = \frac{\Sigma Y_j \cdot \Sigma f(X_i, Y_j)}{\Sigma \Sigma f(X_i, X_j)} \quad (2)$$

$$= \frac{\Sigma Y_j \cdot N_j}{\sum_j N_j}$$

Because, $$f(X_i, Y_j) \begin{cases} = 0 \\ = 1 \end{cases}, \sum_j f(X_i, Y_j) = N_j$$

and

-continued $$\sum_j dj$$

is the area of the object, corresponding to the denominators of equations (1) and (2). In this way, at the same time as the video signal is input the necessary numerators and denominators for the center of gravity computation are determined.

In other words, as preprocessing to find the Y coordinate of the center of gravity, YG, since the scan time in the horizontal direction is sufficiently long (63.5 microseconds), based on the data Nj, Yj for the previous line to the one being scanned now, for each line software is used to compute $$\Sigma Yj \cdot \Sigma f(Xi, Yj) = \Sigma Yj \cdot Nj$$

As preprocessing to find the X coordinate of the center of gravity, XG, while scanning a horizontal line, summing the number of pixels for the same line in software is not possible, because the time per pixel is too short (in this example, 162 ns). Therefore, for each horizontal line, the Xi coordinates for which f(Xi,Yj) is '1' are summed in real time by hardware. Then, based on the data $$\sum_i Xi$$

for the line before the one being scanned, for each line:

$$\sum_i Xi \cdot \sum_i f(Xi, Yj) = \sum_i \sum_i Xi$$

is found by software. Therefore, the computation is principally carried out by firmware.

Thereafter, computations (1) and (2) are carried out during the blanking period by software.

Figure 3:
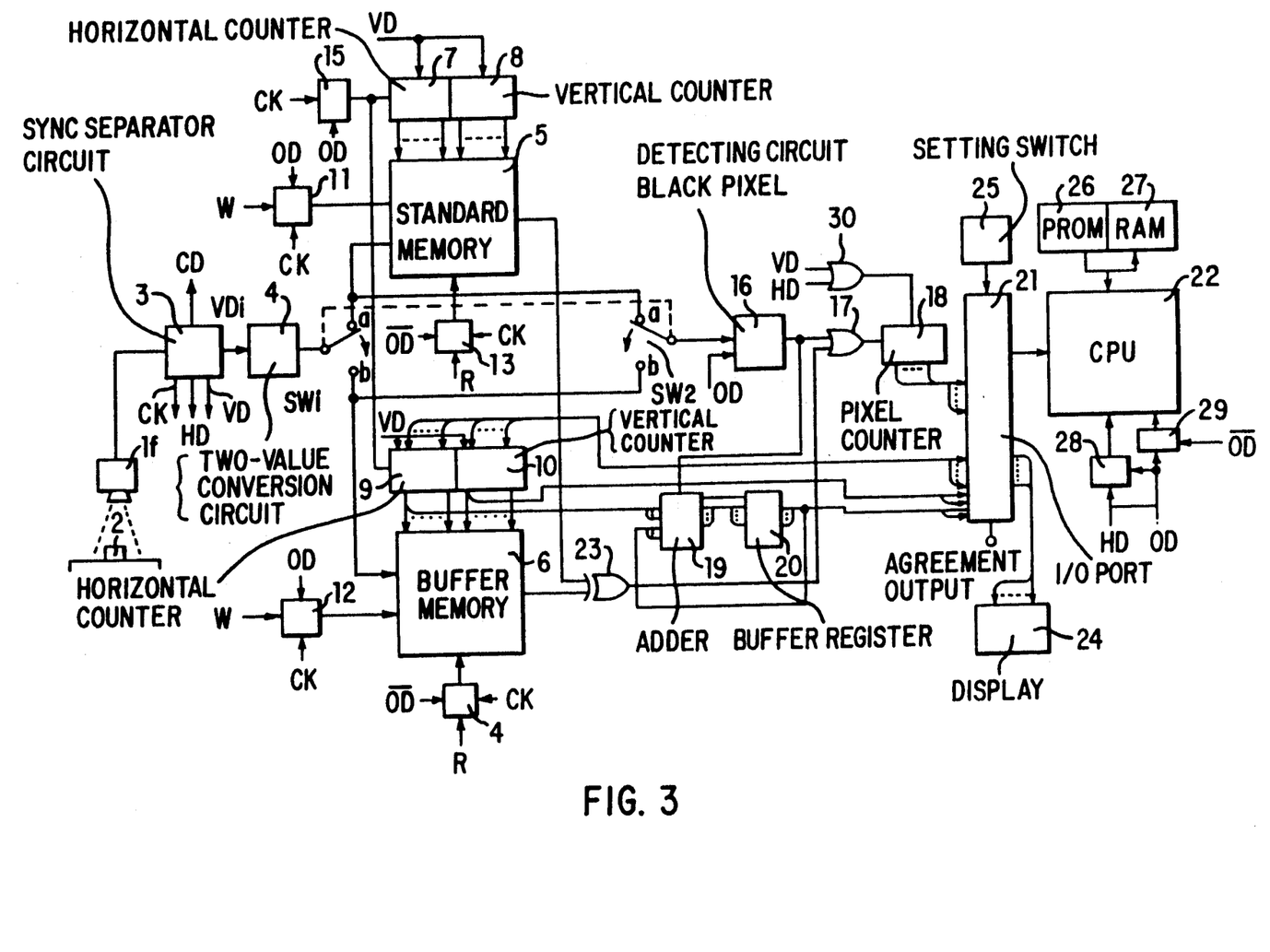
FIG. 3 is a schematic circuit diagram of this preferred embodiment of the image recognition device of the present invention.
Figure 4A:
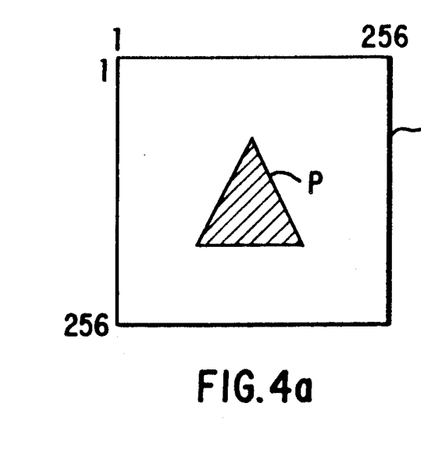
FIGS. 4a and 4b represent a schematic illustration showing an object in the visual field of the image recognition device of FIG. 3.
Figure 4B:
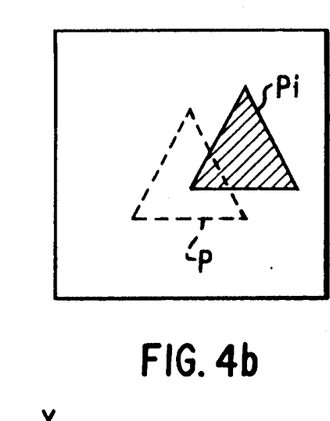
Figures 5A, 5B:
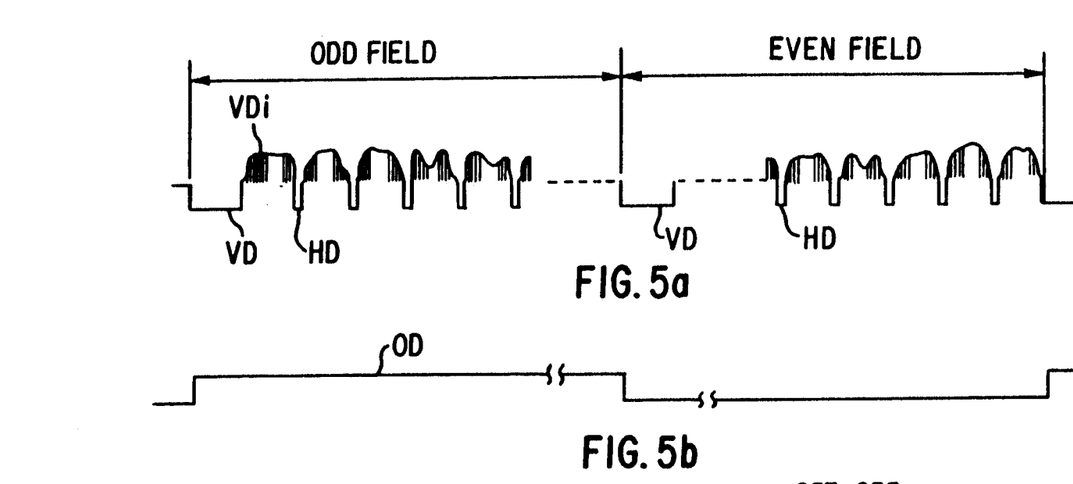
FIGS. 5a-d represent a time chart illustration of some of the signals present in the image recognition device of FIG. 3 during its operation.
Figure 5C:
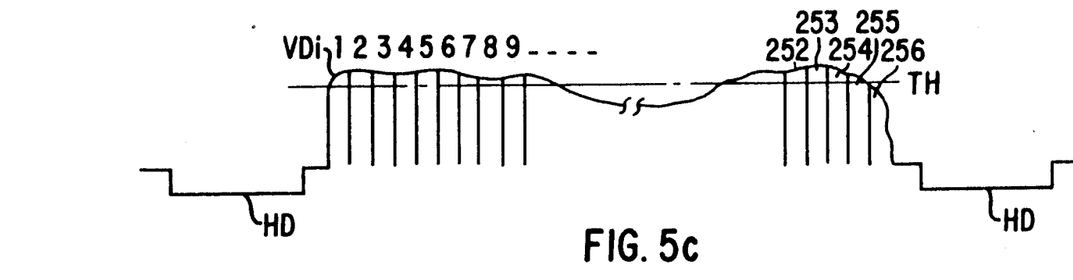
Figure 5D:
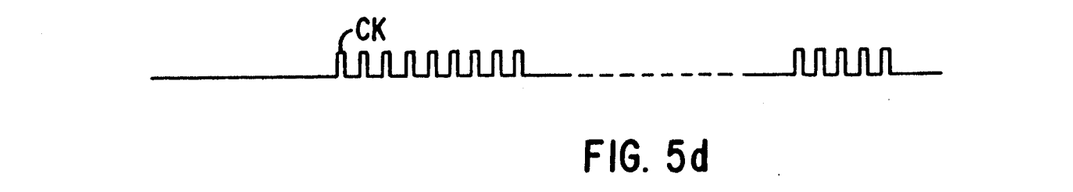

In FIG. 3, there is shown a schematic circuit diagram of this preferred embodiment of the image recognition device of the present invention. In this figure, reference numeral 1f denotes the above mentioned video camera, which images a stationary or moving object 2 from above, under the control of an interlaced scan device (not particularly shown). The output signal from this interlaced scan device, an exemplary form of which is shown in FIG. 5a, is sent to a sync separator circuit 3. This sync separator circuit 3 separates from the image signal a horizontal synchronising signal HD, a vertical synchronising signal VD, an odd field signal OD (shown in FIG. 5b), a clock signal CK (shown in FIG. 5d), and so forth, and sends the video signal VDi to a two-value conversion circuit 4. The two-value conversion circuit 4, as shown in FIG. 5c, sets a fixed threshold value TH for the video signal VDi, and for the odd numbered fields of the video signal VDi forms and outputs a two-valued black and white pattern. To the two-value conversion circuit 4 are connected, through a mode changing switch SW1, a standard memory 5 and a buffer memory 6. When the mode changing switch SW1 is reset to the 'a' training setting, and a standard model is imaged, a standard pattern P, as for example shown in FIG. 4a, is stored in the standard memory 5; but when, on the other hand, the mode changing switch SW1 is set to the 'b' recognition mode setting, and an object to be recognised is imaged, an input pattern Pi such as shown in FIG. 4b is stored in the buffer memory 6. In this preferred embodiment, the patterns are stored in image areas with 256 bits horizontally and vertically, i.e. on a 256 by 256 pixel grid, and in the examples shown in FIGS. 4a and 4b, the input pattern Pi is displaced upwards and to the right with respect to the standard pattern P.

Further, horizontal counters 7 and 9 and vertical counters 8 and 10 specify pixel position addresses within the respective memories when the standard pattern P and the input pattern Pi are being read or written. The gate circuits 11 and 12 and 13 and 14 are opened and closed under the control of the odd field signal OD or a clock signal CK, and supply a write control signal W and a read control signal R to the memories 5 and 6. Next the gate circuit 15 is opened and closed under the control of the odd field signal OD, and supplies a clock signal CK to the horizontal counters 7 and 9 and the vertical counters 8 and 10.

To the two-value conversion circuit 4 is connected, through the ganged mode changing switches SW1 and SW2, a black pixel detecting circuit 16, and then to the black pixel detecting circuit 16 is connected, through an OR circuit 17, a pixel counter 18. The black pixel detecting circuit 16 detects the black pixels forming each pattern (the hatched portions in FIG. 4), and the pixel counter 18 counts the output (corresponding to the black pixels) of the black pixel detecting circuit 16). Also at the output end of the black pixel detecting circuit 16 is connected an adder 19, and this adder 19 adds in hardware for each horizontal scan line the horizontal address for the standard memory 5 or the buffer memory 6 at every black pixel detection timing. This addition value is read into the buffer register 20 for every horizontal scan line, and the cumulative value of the addition is preserved by the buffer register 20. The count data of the pixel counter 18, during each horizontal blanking interval, and the cumulative value of the buffer register 20, at the end of each horizontal scan line, are read through the I/O port 21 into the CPU 22, and the CPU 22, based on the count data and count values read in, computes as described below a weighted mean, and then obtains the positional deviation values ΔX and ΔY for the input pattern with respect to the standard pattern.

The addition values of said horizontal addresses may also be read into the CPU 22 during the horizontal blanking time, and subjected to cumulative processing in the CPU 22.

At the readout output end of the standard memory 5 and the buffer memory 6 is connected an exclusive or (XOR) circuit 23, and at the output end of the XOR circuit 23 is connected the pixel counter 18 through the OR circuit 17. When comparing patterns, the XOR circuit 23 shows an output which is '1' whenever the pixel data values read out from the memories 5 and 6 do not agree, and therefore, in this case, the pixel counter 18 counts the number of disagreeing pixels in the two patterns. This count data is read into the CPU 22 through the I/O port 21, and the CPU 22 displays this data on the display 24, and by comparison of the size of this value with a threshold value set on a setting switch 25, determines a pattern match or mismatch. In the drawing, the PROM 26 holds programs for, for example, position correction, and the RAM 27 holds training data and also provides other work areas used in processing. The gate circuits 28 and 29 generate interrupt signals INT1 and INT2 to the CPU 22, and the OR circuit 30 is a reset circuit for the pixel counter 18.

Figure 6A:
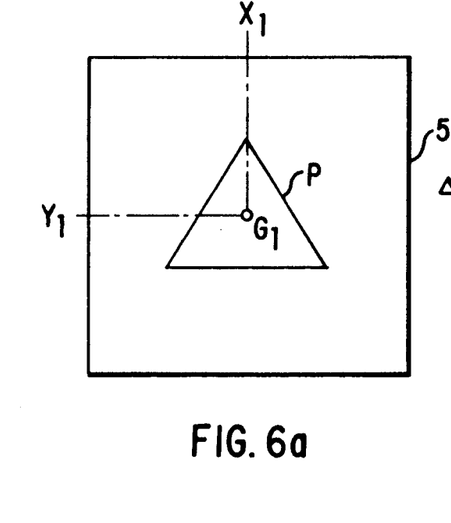
FIG. 6a shows a standard pattern P held in a standard memory.
Figure 6B:
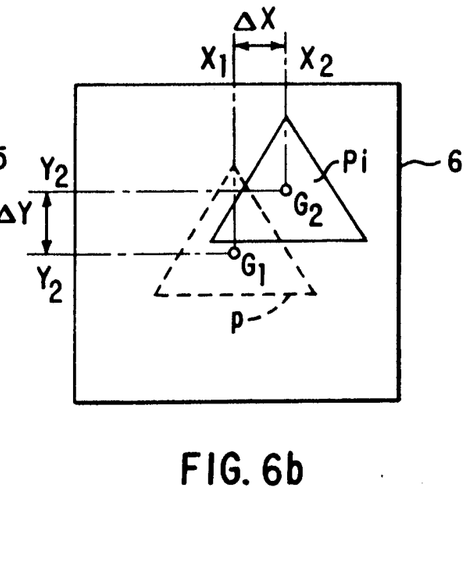
FIG. 6b shows an input pattern Pi held in a buffer memory.

As an example, FIG. 6a shows a standard pattern P held in the standard memory 5 and FIG. 6b shows an input pattern Pi held in the buffer memory 6. In the drawing, G1 and G2 are the weighted means positions (i.e., the centers of gravity) of the standard pattern P and the input pattern Pi, and X1, Y1, X2, Y2 are the position data values for the centers of gravity G1 and G2, and the center of gravity G2 of the input pattern Pi is displaced with respect to the center of gravity G1 of the standard pattern P by $\Delta X$ horizontally and $\Delta Y$ vertically.

Thus, after the mode changing switches SW1 and SW2 are set to the training side 'a', a standard model is imaged by the television camera 1f, two-value processing is carried out for the first odd field of the video signal VDi, and the standard pattern P is written into the standard memory 5. At the same timing the output of the two-value conversion circuit 4 is sent to the black pixel detecting circuit 16, the pixel counter 8 counts the output (corresponding to the number of black pixels) of the black pixel detecting circuit 16, the adder 19 adds the horizontal addresses in the standard memory 5 for each black pixel detection timing, and the summed values for each horizontal scan are written into the buffer register 20 and accumulated. Then, for each horizontal blanking interval, an interrupt signal INT1 to the CPU 22 is generated, and at that time the count value of the pixel counter 18 is read in.

Figure 7:
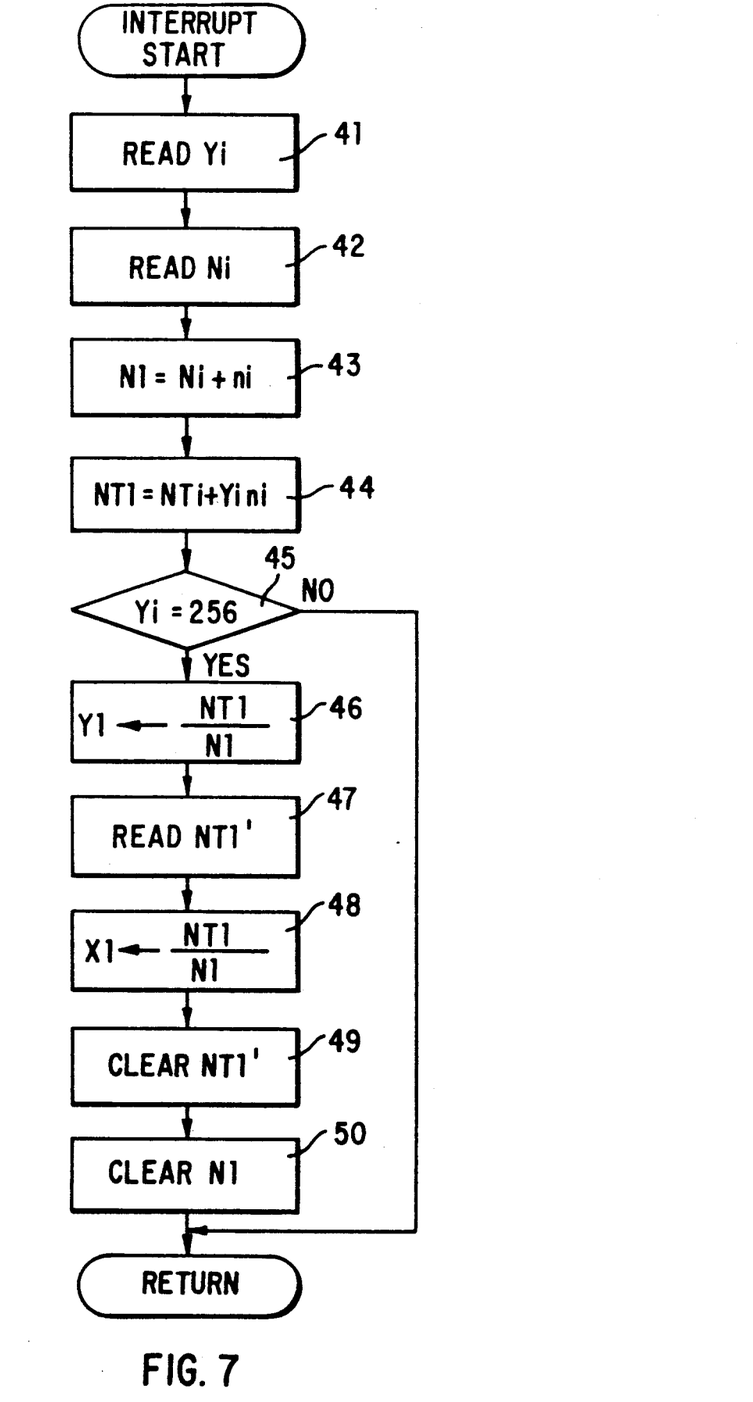
FIG. 7 is a flow chart for explaining the interrupt control operations.

FIG. 7 is a flow chart for explaining the interrupt control operations, and in this flow chart Ni are count values of the pixel counter 18 and Yi are count values of the vertical counter 8 of the standard memory 5 (the vertical addresses of the standard memory 5).

Consider the time at which the black pixel count operation for the Yi-th (Yi<256) horizontal scan line is completed. During the horizontal scan period of the (Yi+1)-th horizontal scan line, first in the step 41 the count value Yi of the vertical counter 8 is read in to the CPU 22, and next in the step 42 the count value Ni of the pixel counter 18 is read in. Next, in the step 43, the cumulative value N1 of the count values Ni is computed. Then in the step 44 the product Yi.Ni of the count value Yi of the vertical counter 8 and the count value Ni of the pixel counter 18 is evaluated, and the cumulative value NT1 is obtained. The step 42 and the step 44 are carried out during the horizontal scan period, and the steps 41 to 44 form an auxiliary calculation means. Next, in the step 45, a check is made as to whether the count value Yi of the vertical counter 8 has reached the final scan line (in this embodiment there are 256 lines), and if the result of the decision is "NO" then the flow of control returns to the start point state awaiting an interrupt, and the black pixel count operation for the next scan line is carried out in the same way.

The processing of the steps 41 to 44 above is repeated, and when the count value Yi of the vertical counter has reached 256, in the step 45 the result of the decision is "YES", and in the next step 46 the cumulative value NT1 is divided by the cumulative value N1 to obtain the vertical weighted mean value of the standard pattern P:

$$\frac{NT1}{N1}$$

and also this calculation data is stored in a data area Y1 in the RAM 27. In the next step 47, the horizontal address addition cumulative value NT1' is read from the buffer register 20, and, in the next step 48, the cumulative value NT1' is divided by the cumulative value N1 to obtain the horizontal weighted mean:

$$\frac{NT1'}{N1}$$

and this is stored in a data area X1 of the RAM 27, after which in the steps 49 and 50 the cumulative values NT1 and N1 are cleared.

The steps 46 to 50 are carried out during the scan return blanking period, and constitute the main calculation means.

Next, in order to carry out recognition processing of an object to be recognised, the mode changing switches SW1 and SW2 are set to the recognition mode setting 'd', and then imaging is carried out in the same way. In this case the input pattern Pi is stored in the buffer memory 6, and, in the same way, for the odd field timing, an interrupt is given for the input pattern Pi. At the same timing, the pixel counting operation of the pixel counter 18 and the execution of the addition operation by the adder 19 are carried out, and, during each horizontal scan line blanking period, an interrupt signal INT1 to the CPU 22 is generated.

Figure 8A:
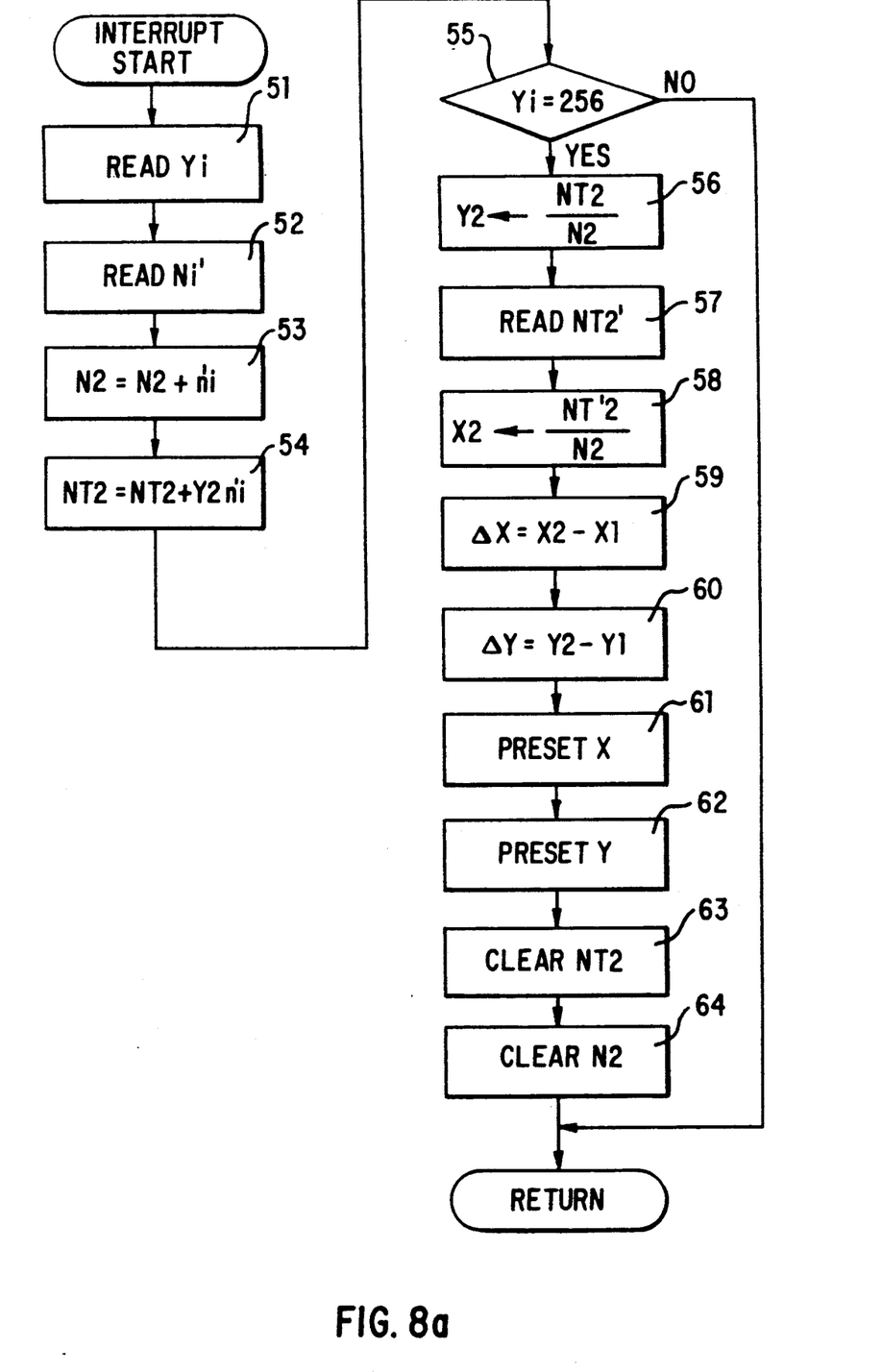
FIGS. 8a and 8b show a pair of flow charts for explaining various other aspects of the operation of the preferred embodiment of the image recognition device according to the present invention.

FIG. 8a is a flow chart for showing the interrupt control operation. The steps 51 to 58 of this drawing are the same as in the flow chart of FIG. 7. In the step 53 the cumulative value N2 of the count value n1' of the pixel counter 18 is found. In the step 54 the cumulative value NT2 of the product Yi.ni' of the count value ni' of the pixel counter 18 and the count value Yi of the vertical counter 10 is obtained. In the step 56 the weighted mean value $$\frac{NT2}{N2}$$

of the input pattern Pi is found from the two values, and this is stored in a data area Y2 of the RAM 27. Next, in the step 57, the cumulative value NT2' of the horizontal address addition value is read out from the buffer register 20, and in the step 58 the cumulative value NT2' is divided by the cumulative value N2 to give the horizontal weighted mean value $$\frac{NT2'}{N2}.$$

This is stored in the data area X2 of the RAM 27.

Thus, in the step 59, from the difference of the data values in the areas X2 and X1, there is calculated the horizontal positional deviation between the patterns $\Delta X$, and in the next step 60, from the difference of the data values in the areas Y2 and Y1, the vertical positional deviation between the patterns $\Delta Y$ is obtained. Then, in the next steps 61 and 62, the positional deviation $\Delta X$ is preset into the horizontal counter 9, and the positional deviation $\Delta Y$ is preset into the vertical counter 10. After positional correction, in the steps 63 and 64, the cumulative values NT2 and N2 are cleared.

Next, in the even fields, address specification is done with the horizontal and vertical counters 7 and 8 into the standard memory 5, and with the preset horizontal and vertical counters 9 and 10 into the buffer memory 6.

Figure 8B:
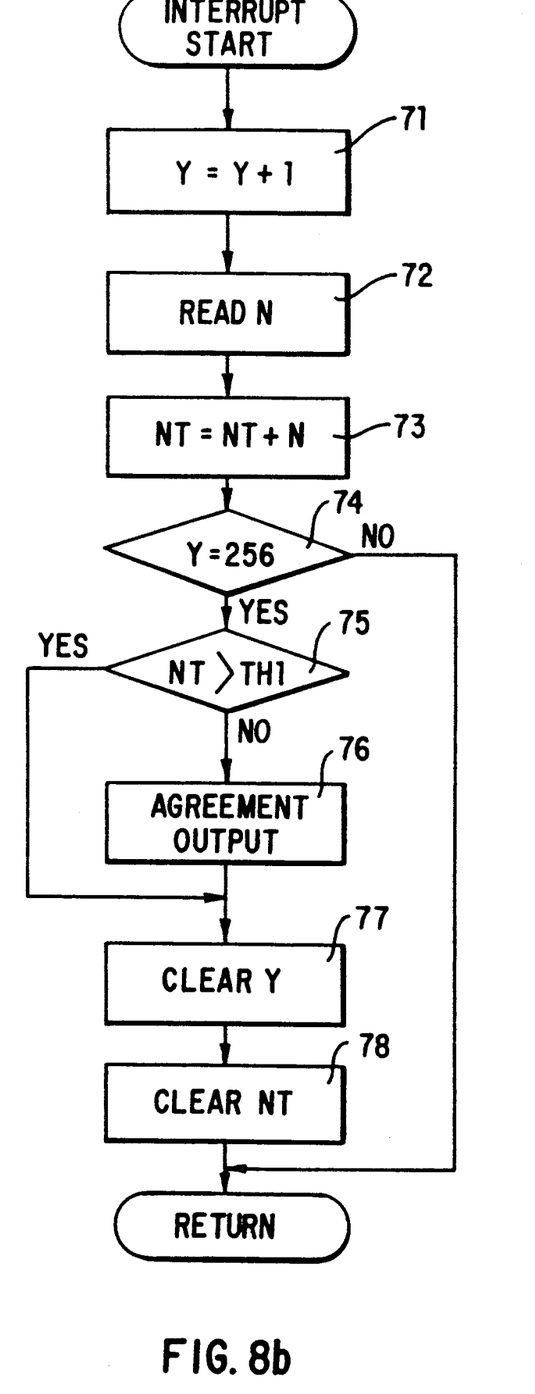

As the image data for the standard pattern P and the input pattern Pi is read out sequentially, the data comparison is effected in an overlaid manner, with the positional deviation corrected. As a result, when the two image data values do not agree, the XOR circuit 23 outputs a logical '1' signal, and the disagreeing pixels are counted by the pixel counter 18. Then, in each horizontal scan line blanking period, an interrupt signal INT2 is generated for the CPU 22, and the processing flow shown in FIG. 8b is begun.

First, in the step 71, after adding 1 to the row counter Y in the RAM 27, in the next step 72 the count value N (for the disagreeing pixels) of the counter 18 is read out, and then in the step 73 the cumulative value NT of the count N is computed. Next in the step 74 a check is made as to whether the value of the row counter Y has reached the whole scan row, and if the result is "NO" control returns to the start point, and the next interrupt is awaited. When the processing for the steps 71 to 73 has been repeated over the whole scan, the result of the test Y=256 in the step 74 will be "YES". Next in the step 75 a size comparison of the cumulative value NT and the threshold value TH1 is made. When the cumulative value NT does not exceed the threshold value TH1, in the step 75 the result of the decision will be "NO", and the input pattern Pi will be judged to agree with the standard pattern P, an agreement output will be made. Finally the row counter Y and the cumulative value NT will be cleared (in the steps 76 to 78).

The next table is a comparison of the characteristics of center of gravity calculation for patterns using principally firmware according to the present invention, with the characteristics of the conventional case of calculations using principally hardware and the conventional case of calculations using principally software. As will be clear from the table, in the present case of calculation using principally firmware, an image memory is not required, and the method is superior on computation time, space and cost to the other methods.

TABLE

| | Comparison of x, y center of gravity computation | | |
|---|---|---|---|
| Item | Conventional | Conventional Method | Present invention |
| | Hardware | Software | Firmware |
| Image memory | Not required | Required | Not required |
| Computation | Video rate | Slow | Video rate |
| time | (17 ms) | (1 to 2 s) | (17 ms) |
| Space | Large | Small | Small |
| Cost | High | Intermediate | Low |

In the above embodiment, a standard memory and a buffer memory were used for the purposes of matching an input pattern with a standard pattern, but it goes without saying that if it is only necessary to obtain the center of gravity of each pattern then these memories will not be required.

Although the present invention has been shown and described in terms of the preferred embodiment thereof, and with reference to the appended drawings, it should not be considered as being limited thereby. Many possible variations on the shown preferred embodiment are possible, without departing from the scope of the present invention; and likewise the presently appended drawings may contain various features which are not essential to the gist of the present invention. Accordingly, the scope of the present invention, and the protection desired to be accorded by Letters Patent, are not to be defined by any of the details of the terms of the above description, or by any particular features of the hereto appended drawings, but solely by the legitimate and proper scope of the accompanying claim limitation which follow.

What is claimed is:

1. A visual recognition device which receives video signals representing an object to be recognized from a video camera, converts said video signals to a two-valued input pattern, and compares said input pattern with a standard pattern to recognize said object, comprising:

an auxiliary computing means for carrying out a predetermined auxiliary computation during a horizontal scan period of said video camera, according to a state of the input pattern;

a main computation means for performing a main computation operation based on computation results of said auxiliary computation means, said main computation operation being carried out only during a vertical return scan blanking period of said video camera; and a recognition means for recognizing said input pattern with respect to said standard pattern based on said computation results of said main computation means with respect to said patterns.

* * * * *